(12) United States Patent
Weiss et al.

(10) Patent No.: US 6,947,714 B2
(45) Date of Patent: Sep. 20, 2005

(54) PIEZO-POWERED AMUSEMENT DEVICE IDENTIFICATION SYSTEM

(75) Inventors: Stephen Nicholas Weiss, Philadelphia, PA (US); Gregory M. Huffman, Petaluma, CA (US); Jesse Dorogusker, San Francisco, CA (US)

(73) Assignee: Mattel, Inc., El Segundo, CA (US)

( * ) Notice: Subject to any disclaimer, the term of this patent is extended or adjusted under 35 U.S.C. 154(b) by 104 days.

(21) Appl. No.: 10/648,669

(22) Filed: Aug. 26, 2003

(65) Prior Publication Data

US 2004/0085224 A1 May 6, 2004

Related U.S. Application Data (60) Provisional application No. 60/422,702, filed on Oct. 31, 2002.

(51) Int. Cl.[7] ............................................. H01Q 11/12
(52) U.S. Cl. ................ 455/127.1; 455/90.3; 455/343.1; 455/578.1; 550/339; 341/22
(58) Field of Search ........................... 455/127.1, 91, 455/575.1, 90.3, 573, 574, 571–572, 343.1–343.6, 344; 310/316–319, 338–339, 311, 314; 341/22, 176

(56) References Cited

U.S. PATENT DOCUMENTS

| | | | |
|---|---|---|---|
| 3,878,521 A | | 4/1975 | Lictis et al. |
| 4,207,502 A | | 6/1980 | Omura |
| 4,275,394 A | | 6/1981 | Mabuchi et al. |
| 4,443,783 A | | 4/1984 | Mitchell |
| 4,465,949 A | * | 8/1984 | Knauff ......................... 310/81 |
| 4,545,583 A | | 10/1985 | Pearman et al. |
| 4,612,472 A | | 9/1986 | Kakizaki et al. |
| 4,654,659 A | | 3/1987 | Kubo |
| 4,700,179 A | | 10/1987 | Fancher |
| 4,713,660 A | | 12/1987 | Camenzind |
| 4,736,312 A | * | 4/1988 | Dassler et al. ............... 702/160 |
| 4,862,160 A | | 8/1989 | Ekchian et al. |
| 4,937,581 A | | 6/1990 | Baldwin et al. |
| 4,938,483 A | | 7/1990 | Yavetz |
| 4,980,680 A | | 12/1990 | Knoll et al. |
| 5,014,040 A | | 5/1991 | Weaver et al. |
| 5,065,067 A | * | 11/1991 | Todd et al. .................. 310/339 |

(Continued)

OTHER PUBLICATIONS

Paradiso, Joseph A. and Mark Feld Meir, "A Compact, Wireless,, Self–Powered Pushbutton Controller,"Responsive Environment Group, MIT Laboratory, Cambridge, MA, 2000–2001, "UBICOMP 2001: Ubiquitous Computing," ACM UBICOMP Conference Proceedings, Atlanta, GA, Sep. 2001, pp. 299–304 (labeled A1–A6).

Roundy, SAAD, "Energy Scavenging for Very Low Power Wireless Sensor Notes," U. C. Berkeley Presentation, Sep. 2001,(Labeled B1–B29).

*Primary Examiner*—Pablo N. Tran
(74) *Attorney, Agent, or Firm*—Akin Gump Strauss Hauer & Feld, LLP (57) ABSTRACT

An identification transmission system for use in an amusement device includes a transmitting antenna, a transmitter and a piezo-electric power source. The transmitter circuit is configured to broadcast a predetermined tone on a predetermined carrier frequency through the antenna. The piezo-electric power source is electrically coupled to the transmitter circuit and is configured to at least briefly provide power to the transmitter circuit. The piezo-electro power source includes a piezo-electric element, a striker, a storage capacitor and a voltage controlled switch. The striker is configured to move so as to at least briefly strike the piezo-electric element. The storage capacitor is configured to receive and store electrical charge from the piezo-electric element. The voltage controlled switch is configured to allow the storage capacitor to discharge through the transmitter circuit thereby providing power thereto after a predetermined amount of charge has been stored.

8 Claims, 5 Drawing Sheets

U.S. PATENT DOCUMENTS

| | | | |
|---|---|---|---|
| 5,381,137 A | | 1/1995 | Ghaem et al. |
| 5,442,343 A | | 8/1995 | Cato et al. |
| 5,469,170 A | | 11/1995 | Mariani |
| 5,500,637 A | | 3/1996 | Kokubu |
| 5,568,095 A | | 10/1996 | Hill |
| 5,572,190 A | | 11/1996 | Ross et al. |
| 5,619,074 A | | 4/1997 | Berch et al. |
| 5,846,085 A | | 12/1998 | Witt, III |
| 5,889,464 A | * | 3/1999 | Huang ........................ 340/442 |
| 6,104,295 A | | 8/2000 | Gaisser et al. |
| 6,114,971 A | | 9/2000 | Nysen |
| 6,137,415 A | | 10/2000 | Rast |
| 6,150,600 A | * | 11/2000 | Buchla ........................ 84/666 |
| 6,151,278 A | * | 11/2000 | Najarian ...................... 368/12 |
| 6,166,643 A | * | 12/2000 | Janning et al. ........... 340/573.3 |
| 6,463,600 B1 | | 10/2002 | Conway et al. |
| 6,487,991 B2 | | 12/2002 | So |
| 6,491,639 B1 | * | 12/2002 | Turcott ....................... 600/508 |
| 6,533,502 B2 | * | 3/2003 | McVay et al. .............. 405/232 |
| 6,604,946 B2 | * | 8/2003 | Oakes ......................... 434/11 |
| 6,630,894 B1 | * | 10/2003 | Face, Jr. et al. .............. 341/22 |
| 6,708,441 B2 | * | 3/2004 | Dirito ........................... 43/17 |
| 6,764,446 B2 | * | 7/2004 | Wolinsky et al. ........... 600/300 |
| 6,792,259 B1 | * | 9/2004 | Parise ..................... 455/343.1 |
| 6,812,594 B2 | * | 11/2004 | Face et al. .................. 307/119 |
| 2002/0190610 A1 | * | 12/2002 | Andre et al. ................ 310/339 |
| 2004/0130331 A1 | * | 7/2004 | Frederick et al. ........... 324/555 |

* cited by examiner

PIEZO-POWERED AMUSEMENT DEVICE IDENTIFICATION SYSTEM

CROSS REFERENCE TO RELATED APPLICATIONS

This Application claims the benefit of U.S. Provisional Patent Application No. 60/422,702 filed Oct. 31, 2002, entitled "Piezo-Powered Amusement Device Identification Transmission System," the entire contents of which is incorporated by reference herein.

BACKGROUND OF THE INVENTION

The present invention relates to electro-mechanically powered radio frequency (RF) transmission devices and, more particularly, to piezo-powered RF transmission devices that can send coded signals to a receiver or to a plurality of receivers.

One control circuit employing a piezo-electric transducer is described in U.S. Pat. No. 4,612,472 which discloses a remote controlled toy that utilizes a piezo-electric transducer in a hand-held transmitter to produce an RF signal. The toy vehicle, a cross between a machine and a dinosaur, does not transmit any signals, it only receives them. Upon application of a force on the top of a (blind) transmitter head, a slide element forces a striking element in the hand-held transmitter which is subsequently forced against the piezo-electric transducer causing a current to be generated. The current is fed to the contact point where a spark jumps across a spark gap to an antenna. The spark, in jumping across the spark gap, causes the RF signal to be transmitted from the antenna to the receiving antenna of the toy vehicle where drive motor is turned off and on by consecutive spark signals.

Another control circuit employing a piezo-electric transducer is described in U.S. Pat. No. 4,713,660 which discloses an electronic key that transmits a signal to an electronic lock. The electronic key has a power source which could be either a piezo-electric transducer or a solar cell. The power source charges a capacitor through a diode, which is used as the voltage source for all the electronic components of the electronic key. The electronic key uses a crystal oscillator (a piezo-electric element) to send a signal to a capacitor and then to a coil which functions as an antenna. A unique signal is generated by the electronic key through the use of a plurality of different resistive elements and a signal generator having a plurality of different timing periods. The lock includes a coil which acts as an antenna and a capacitor connected in parallel to the coil. The coil is the same value as the transmitting coil of the key 10 and is designed to receive the signals from the key.

Yet another control circuit employing a piezo-electric transducer is described in U.S. Pat. No. 4,937,581 which discloses an identification system used for identifying moving objects, such as railroad cars, from a remote interrogation station includes an information and identity storage device mounted on the railroad car and at least one interrogation station, located close to where the railroad car would pass. Upon being triggered by a signal from the remote interrogation station, the transmitter on the information and identity storage device, transmits stored data, such as the railcar's owner and identity, to the remote interrogation station. Power for the transmitter is provided by a power source, such as a piezo-electric material. A mass is mounted on a resilient strip that has the piezo-electric material bonded thereto. Vibration of the railcar causes movement of the mass which in turn deflects the resilient strip and piezo-electric material which generates an alternating voltage. The alternating voltage is rectified by diodes and stored in capacitors. The interrogation station, in addition to as sending a trigger signal, also sends a programming signal to the information and identity storage device in order to change or add information to the stored data residing in the information and identity storage device (i.e., bi-directional communication). Both the interrogation station and the information and identity storage device have a pair of antennas; one antenna for transmitting, and another antenna for receiving. A clock oscillator or watch crystal is used in the information and identity storage device for synchronization purposes when transmitting to the interrogation station.

What is needed but not provided by the prior art is a piezo-powered system that broadcasts a unique identification signal without the system being interrogated. Moreover, what is needed but not provided by the prior art is an identification system that automatically transmits a unique identification signal as often as a storage capacitor is charged to a predetermined minimum charge value needed for transmission by a piezo-electric element.

BRIEF SUMMARY OF THE INVENTION

Briefly stated, the present invention comprises an identification transmission system particularly suited for use in an amusement device. The identification transmission system includes a transmitting antenna, a transmitter circuit and a piezo-electric power source. The transmitter circuit is configured to broadcast a predetermined tone on a predetermined carrier frequency through the antenna. The piezo-electric power source is electrically coupled to the transmitter circuit and is configured to at least briefly provide power to the transmitter circuit. The piezo-electric power source includes a piezo-electric element, a striker, a storage capacitor and a voltage controlled switch. The striker is configured to move so as to at least briefly strike the piezo-electric element. The storage capacitor is configured to receive and store electrical charge from the piezo-electric element. The voltage controlled switch is configured to allow the storage capacitor to discharge through the transmitter circuit thereby providing power thereto after a predetermined amount of charge has been stored.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "lower" and "upper" designate directions in the drawings to which reference is made. The words "inwardly" and "outwardly" refer to directions toward and away from respectively, the geometric center of the device discussed and designated parts thereof. The terminology includes the words above specifically mentioned, derivatives thereof and words of similar import. Additionally, the word "a" as used in the claims and in the corresponding portions of the specification, means "one or more than one." The term "piezo-electric" as used to describe materials generally refers to materials having properties such that a force, strain or vibration imposed or inflicted on those materials creates an electrical output from those materials.

Figure 1A:
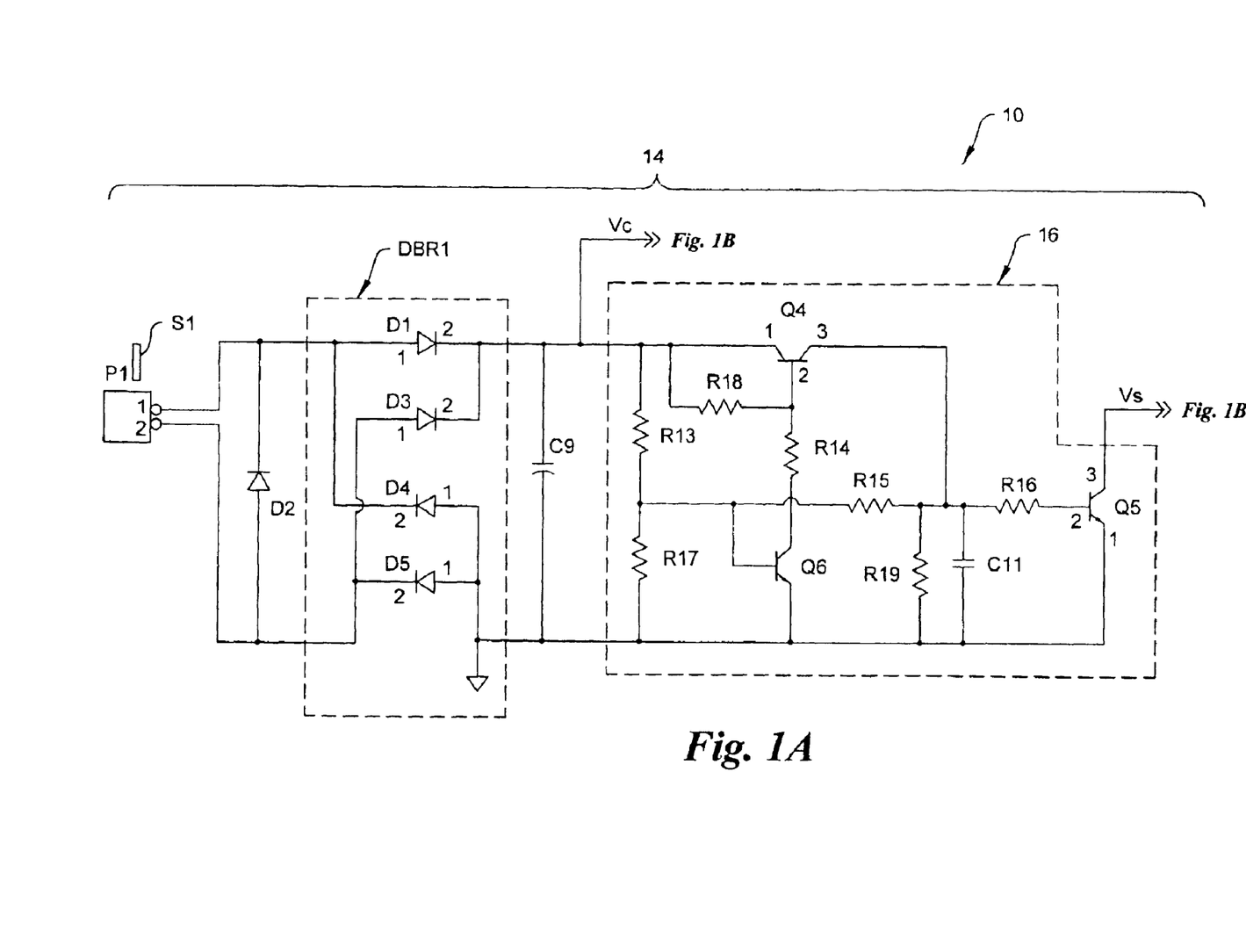
FIGS. 1A–1B are electrical schematic diagrams of an identification transmission system in accordance with a preferred embodiment of the present invention.
Figure 1B:
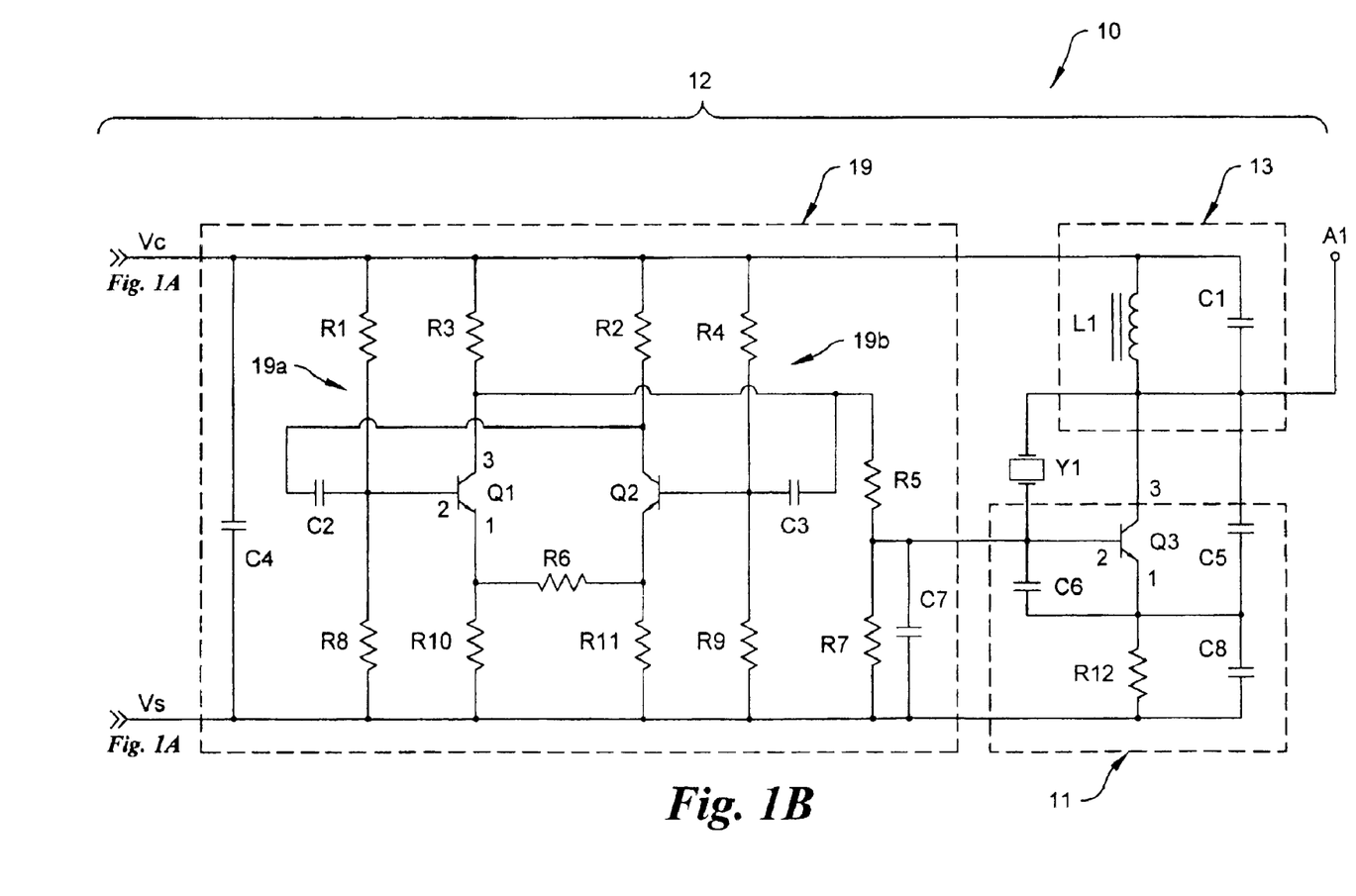

In the drawings, like numerals are used to indicate like elements throughout. Referring to the drawings in detail, there is shown in FIGS. 1A–1B a identification transmission system 10 in accordance with a preferred embodiment of the present invention.

The identification transmission system 10 is for use with learning devices, amusement devices and the like, but preferably the identification transmission system 10 is used with an amusement device such as a toy car, a toy figure or doll and the like having one or more moving parts which can be used to power the system. Generally, the identification transmission system 10 is for sending signals or coded signals to a receiver or a plurality of receivers (not shown) without requiring a battery (not shown).

The identification transmission system 10 includes a transmitting antenna A1, a transmitter circuit 12 and a piezo-electric power source 14. The transmitter circuit 12 is configured to broadcast a predetermined tone on a predetermined carrier frequency through the antenna A1. The predetermined tone is between about 600 Hz and about 2200 Hz. The piezo-electric power source 14 is electrically coupled to the transmitter circuit 12 and is configured to at least briefly provide power to the transmitter circuit 12. The piezo-electro power source 14 includes a piezo-electric element P1, a striker S1, a storage capacitor C9 and a voltage controlled switch 16. The striker S1 is configured to move so as to at least briefly strike the piezo-electric element P1. The storage capacitor C9 is configured to receive and store electrical charge from the piezo-electric element P1. The voltage controlled switch 16 is configured to allow the storage capacitor C9 to discharge through the transmitter circuit 12 of the identification transmission system 10 thereby providing power thereto after a predetermined amount of charge has been stored in the storage capacitor C9. Thus, once the voltage on the storage capacitor C9 reaches a defined trip point, the voltage-controlled switch 16 delivers the stored energy in the storage capacitor C9 to the "load" section or the transmitter circuit 12.

The piezo-electric element P1 can be any piezo-electric transducer formed of any suitable piezo-electric material such as quartz crystal, polarized ferro-electric ceramic, lead zirconium titanate (PZT), polyvinylidene fluoride (PVDF) and the like without departing from the present invention. Preferably, the piezo-electric element P1 is a PZT-type transducer.

As the striker S1 strikes the piezo-electric element P1, a periodic voltage (alternating current or AC type) is developed at output leads 1, 2 of the piezo-electric element P1 which are connected to the rest of the identification transmission system 10. The periodic voltage is gated through a diode D2, rectified through a diode bridge-rectifier DBR1 and stored in the storage capacitor C9. Preferably, the diode D2 is a fast, low leakage type diode such as a Shottky diode. Preferably, the storage capacitor C9 is a low equivalent series resistance (ESR), high capacity type-capacitor. Thus, the piezo-electric element P1, in combination with the striker S1, the diode bridge-rectifier DBR1 and the Shottky diode D2, is essentially used as a voltage-based power source to charge the storage capacitor C9.

The transmitter circuit 12 includes a crystal or inductance/capacitance (L/C) carrier oscillator Y1, a low frequency oscillator 19 or a simple sound chip (not shown) used as an on/off keyed (OOK) modulation source, an amplifier portion 11, an antenna matching network 13, and the output antenna A1. The output signal comprises a predetermined common carrier frequency such as 27 MHz, 40 MHz, or 49 MHz radio frequency (RF) that is amplitude modulated (AM) by a predetermined low frequency signal. Thus, the predetermined low frequency signal, i.e., the "data", can be either an analog tonal waveform generated by the low frequency oscillator 19 or a digitally encoded tonal waveform generated by a simple sound chip. Other forms of encoding may be utilized such as frequency, phase, and combinations thereof. Further, the encoding may be accomplished by keying, including amplitude shift keying (ASK) frequency shift keying (FSK), phase shift keying (PSK), binary shift keying (BSK) and the like.

The predetermined common carrier frequency is selected between about 38 KHz and about 900 MHz, but suggestedly is within the range of about 20 MHz to 50 MHz already employed in radio control toys, for example, about 27 MHz. The frequency for the predetermined carrier signal is selected in the public domain frequency range and must only meet regulatory noise compliance criteria. The carrier frequency is selected to minimize the power requirements while still maintaining a robust signal for a desired range. Of course other common frequencies can be utilized without departing from the present invention. The low frequency signal or signals are selected between about 600 Hz and 2200 Hz and are preferably selected in 100 Hz increments to avoid tone overlap when there are a plurality of transmitter circuits 12 each having unique or separate tonal identification low frequency signals (e.g., 810 Hz, 900 Hz, 1100 Hz, etc.). The low frequency is preferably optimally selected so as to maximize the quality factor (Q factor=how sharp the tone is) while still minimizing the overall cost of the circuitry. Of course other means of selecting the low frequency may be utilized without departing from the present invention.

The antenna matching network 13 includes a inductance coil or inductor L1 and a capacitor C1. The inductor L1 is selected such that the inductance in parallel with the capacitor C1 and the loading capacitance of the antenna A1 achieves resonance at the frequency of the crystal Y1 (i.e., the capacitive reactance is approximately equivalent to the inductive reactance). Preferably, the antenna A1 is simply a length of wire, however, other antennas may be utilized as is known in the art without departing from the present invention.

When the energy is delivered to the transmitter circuit 12, two oscillators 19a, 19b power up and begin to oscillate. The total amount of time that the transmitter circuit 12 is powered and operational is on the order of fractions of a second. The oscillators 19a, 19b are mixed and then transmitted through the amplifier 11 to the antenna matching network 13 and finally to the output antenna A1. The output signal to the antenna A1 generates the RF transmission. In order to identify one RF transmission from others, amplitude modulation (AM) is applied to the carrier signal to create different tones on the common carrier frequency. The difference between the modulating oscillators 19a, 19b of different identification transmission system 10 may be created by differences in selected passive components (i.e., values of resistors and capacitors). Each individual identification transmission system 10 is, therefore, a self-powered (by mechanical work) transmitter (TX) or transmitting unit (TXU) that does not require internal batteries or an external power supplying signal. The individual identification transmission systems 10 also do not need receiver circuitry to operate. The differences in codes, whether tonal or digital in nature, between identification transmission systems 10 allow a receiver (RX) or receiving circuit to interpret and distinguish a plurality of transmission sources (e.g., toy vehicles 20).

A receiver (RX, not shown) with multiple or master control unit (MCU) (not shown) and receiver circuitry (not shown) decodes tone information so that different identification transmission systems 10 can be identified by the particular tone that each individual identification transmission system 10 transmits. The MCU may be a base station in a play set, such as a play police station, service station and the like, or a play set may have multiple MCUs. The RX receives the common carrier frequency from all of the identification transmission systems 10 within range and decodes the different tones, in the present case, the AM pulse rates. The tones are selected to meet the power and time constraints of the identification transmission system 10 and ease of decoding in the RX circuit. Different tones may be selected between different identification transmission systems 10 by merely substituting different component values such as the capacitance values for capacitors C2, C3 and the like. A typical RX will include a microcontroller or microprocessor in conjunction with analog/linear circuit components used to gather, demodulate and decode the aforementioned transmissions to cause a desired output function such as amusement device recognition, and the like.

Figure 2:
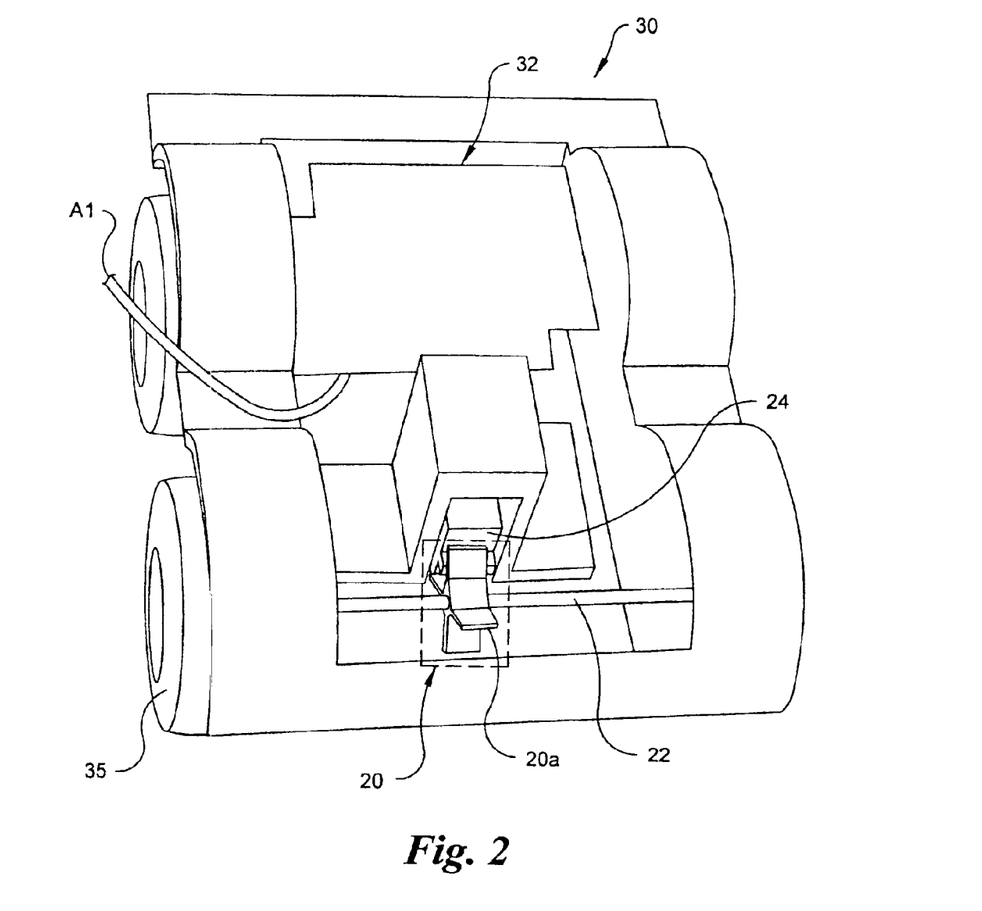
FIG. 2 is an sectional view of a toy vehicle utilizing the identification transmission system of FIGS. 1A–1B.

Referring to one possible amusement device application shown in FIG. 2, the identification transmission system 10 is used in a push-around play or toy vehicle 30 that has no batteries or motor. The toy vehicle 30 includes a toy vehicle mounted circuit 32 and an eccentric cam actuator 20 attached to a wheel axle 22 of the toy vehicle 30 that "plucks" a piezo-electric element P1' which is mechanically attached to the toy vehicle chassis 34. The toy vehicle circuit 32 includes substantially similar components to those of the identification system 10 shown in FIGS. 1A–1B, in addition to a wire antenna A1' and particular electro-mechanical components as described below regarding FIG. 3.

Figure 3:
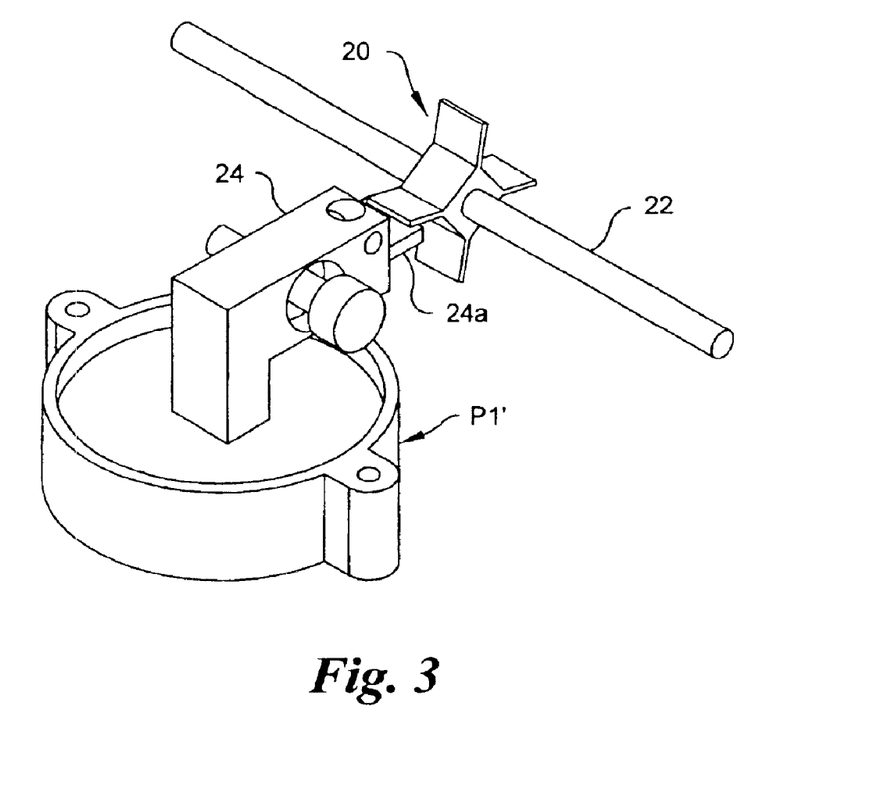
FIG. 3 is a perspective view of a striker mechanism in accordance with a first preferred embodiment of the present invention for use with the identification transmission system of FIGS. 1A–1B.

FIG. 3 shows that a multi-toothed wheel 20 is fixed to the axle 22 of a toy vehicle 30. Teeth 20a of the multi-toothed wheel 20 contact one end 24a of a lever or hammer 24. The hammer 24, is spring-biased toward the surface of a piezo-electric element P1'. In the presently preferred embodiment, the hammer 24 combined with the teeth 20a of the multi-toothed wheel 20 forms a striker mechanism S1'. Each time one of the teeth 20a the multi-toothed wheel 20 passes over the end 24a of the hammer 24, it pivots and then releases the hammer 24, the hammer 24 strikes the piezo-electric element P1'. The teeth 20a of the multi-toothed wheel 20 actuate the striker mechanism S1' in one direction only, for example when rolling the toy vehicle forward. The hammer 24 is supported to displace away from the piezo-electric element P1' when contacted by a tooth 20a of the multi-toothed wheel 20 from the opposite direction (underside in FIG. 3), so rolling the toy vehicle in the other direction has no effect. However, it is contemplated that the coupling can be configured such that rolling the toy vehicle in either direction will cause multi-toothed wheel 20 to rotate thereby causing the striker 24 to strike the piezo-electric element P1' and transmit a tone regardless of the direction that the multi-toothed wheel 20 is turned. Thus, the amusement device, in this case the toy vehicle 30, has a cyclically operating mechanism comprising the multi-toothed wheel 20 and the axle 22 which is operably coupled with the striker 24 to repeatedly strike the piezo-electric element P1' during use of the toy vehicle 30. It is apparent that at least one wheel 35 is coupled to the axle 22 of the toy vehicle 30, and therefore, the striker 24 is operably coupled to the wheel 35 by way of the axle 22 and is directly or indirectly actuated by rotation of the wheel 35.

It is contemplated that the device includes another moveable part accessible by a user, similar to the wheels 35, such that the striker 24 is coupled to the other moveable part and is actuated by movement of the moveable part by a user. Each toy vehicle 30 is, therefore, a self-powered TX that does not require internal or external power supplies to be operable. For example, instead of a wheel 35, the striker 24 may be coupled directly or indirectly to another vehicle component such as a tractor tread on a tank drive, a propeller on a boat or an airplane and the like. Further, the striker 24 may be coupled directly or indirectly to another moveable part of another amusement device such as an appendage of a doll or figure, a walking mechanism within a doll or figure, and the like. Even further, the striker 24 may be coupled directly or indirectly to another moveable part on any object for amusement such as miniaturized furniture, miniaturized or mock appliances, miniaturized or mock tools, miniaturized or mock guns, game pieces and the like. Broadly speaking, the striker 24 could be linked to any mechanism on an amusement device that allows for actuation thereof without departing from the broad inventive scope of the present invention.

Figure 4:
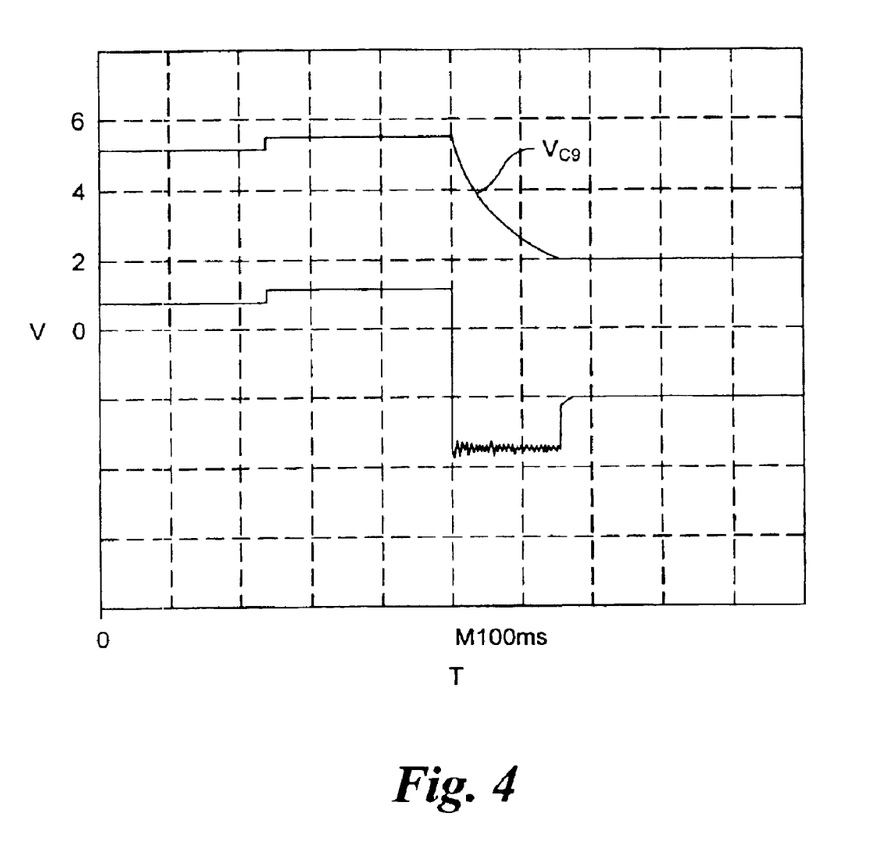
FIG. 4 is an oscilloscope trace of voltages measured across components of the identification transmission system of FIGS. 1A–1B having a specific set of component values.

FIG. 4 shows an example of voltage waveforms across the storage capacitor C9 (upper trace) and from the collector of transistor Q5 to ground (lower trace) for the identification transmission system 10 when used with the striker 24 in the toy vehicle 30. Approximately 16 strikes of the piezo-electric element P1' are required to initiate a given RF transmission burst. The positive voltage step on the left-hand side for each trace is from the 15th strike of the piezo-electric element P1'. On the next strike, or about 275 milliseconds later, the identification transmission system 10 transmits a signal (at about 5.5V on the output). The voltage measured on the storage capacitor C9 decays exponentially to about 2V, where the voltage controlled switch 16 switches off again. Of course other component values for the identification transmission system 10 may be selected and piezo-electric elements P1/P1' having other voltage, frequency or tonal output characteristics may be utilized without departing from the present invention.

From the foregoing, it can be seen that the present invention comprises an identification transmission system used with a learning or amusement device. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. In an amusement device, an identification transmission system comprising:
   a transmitting antenna;
   a transmitter circuit configured to broadcast a predetermined tone on a predetermined carrier frequency through the antenna; and
   a piezo-electric power source electrically coupled to the transmitter circuit and configured to at least briefly provide power to the transmitter circuit, the piezo-electro power source including:
      a piezo-electric element;
      a striker configured to move so as to at least briefly strike the piezo-electric element;
      a storage capacitor configured to receive and store electrical charge from the piezo-electric element;
      a circuit ground reference electrically coupled to the storage capacitor; and
      a voltage controlled switch having a predetermined voltage trip point, the voltage controlled switch electrically coupling the transmitter circuit to one of the storage capacitor and the circuit ground reference when an amount of charge stored in the storage capacitor causes voltage on the storage capacitor to be greater than or equal to the predetermined voltage trip point thereby permitting the storage capacitor to discharge through the transmitter circuit, the voltage applied to the transmitter circuit from the storage capacitor decaying as the storage capacitor discharges.

2. The identification transmission system according to claim 1, wherein the striker is configured to repeatedly strike the piezo-electric element.

3. The identification transmission system according to claim 1, wherein the predetermined tone is between about 600 Hz and about 2200 Hz.

4. The identification transmission system according to claim 1, wherein the predetermined carrier frequency is between about 38 KHz and about 900 MHz.

5. The identification transmission system according to claim 1, wherein the device has a cyclically operating mechanism operably coupled with the striker to move the striker to repeatedly strike the piezo-electric element during use of the device.

6. The identification transmission system of claim 1, wherein the transmitter includes a digital encoding circuit configured to digitize the predetermined tone.

7. The identification transmission system of claim 1, wherein the device is a toy vehicle having at least one wheel, wherein the striker is coupled to the wheel and is actuated by rotation of the wheel.

8. The identification transmission system of claim 1, wherein the device includes a moveable part accessible by a user, wherein the striker is coupled to the moveable part and is actuated by movement of the moveable part by a user.

* * * * *